(12) United States Patent
Chen et al.

(10) Patent No.: US 7,359,763 B2
(45) Date of Patent: Apr. 15, 2008

(54) CUTTING TOOL ANGLE ADJUSTMENT METHOD

(75) Inventors: Kuei-Jung Chen, Miaoli (TW);
Sin-Len Tan, Feng-shou Village, Min Hsiung Township, Chiayi County (TW);
Chih-Yi Lai, Jhudong Township, Hsinchu County (TW); Meng-Chun Chen, Minji Village, Syuejia Township, Tainan County (TW)

(73) Assignee: Industrial Technology Research Institute, Hsinchu (TW)

( * ) Notice: Subject to any disclaimer, the term of this patent is extended or adjusted under 35 U.S.C. 154(b) by 584 days.

(21) Appl. No.: 11/010,336

(22) Filed: Dec. 14, 2004

(65) Prior Publication Data

US 2006/0036337 A1 Feb. 16, 2006

(30) Foreign Application Priority Data

Aug. 16, 2004 (TW) .............................. 93124535 A

(51) Int. Cl.
*G06F 19/00* (2006.01)
*B23Q 15/00* (2006.01)
*G06K 9/00* (2006.01)

(52) U.S. Cl. ...................... 700/193; 700/174; 700/192; 700/195; 83/74; 382/152

(58) Field of Classification Search ................ 700/160, 700/164, 173–176, 186, 192, 193, 195; 382/152, 382/199; 83/861, 74; 348/127
See application file for complete search history.

(56) References Cited

U.S. PATENT DOCUMENTS

| 4,328,553 A | * | 5/1982 | Fredriksen et al. | .... 356/139.04 |
| 4,557,599 A | * | 12/1985 | Zimring | .................. 356/243.1 |
| 6,799,472 B2 | * | 10/2004 | Nakayama et al. | ........... 73/827 |

* cited by examiner

*Primary Examiner*—Sean Shechtman
(74) *Attorney, Agent, or Firm*—Rabin & Berdo, P.C.

(57) ABSTRACT

A cutting tool adjustment method includes lowering a cutting tool on a transparent Mylar to produce an indentation before an actual scribing operation; picking up the image of the indentation; using a numerical analysis method and a set formula to automatically calculate a correction angle and position so as to adjust the angle and position of the cutting tool subject to the calculation result; and repeating the calculation and adjustment procedures, if necessary.

7 Claims, 6 Drawing Sheets

Angle of deviation of the transverse axis (T-axis)

Angle of deviation of the center axis (A-axis)

CUTTING TOOL ANGLE ADJUSTMENT METHOD

BACKGROUND OF THE INVENTION

1. Field of the Invention

The present invention relates to a cutting tool angle adjustment method and more particularly, to such an efficient cutting tool angle adjustment method practical for use to adjust the angle and position of the cutting tool of a fragile material scriber/breaker.

2. Description of Related Art

In a fragile material scriber/breaker, for example, wafer scriber, a cutting tool (for example, diamond cutter) is used for scribing wafers. This cutting tool has a cutting edge. During scribing operation, the cutting edge is lowered and pressed on the wafer.

Further, the cutting edge of the cutting tool must be adjusted to the desired angle and position before scribing, so that a good cutting indentation can be achieved (see FIG. 8E). Without proper adjustment before scribing, the cutting indentation thus produced may have an angle of deviation or uneven width (see FIGS. 8A through 8D). Therefore, the operator must adjust the angle and position of the cutting edge of the cutting tool before scribing.

Conventionally, the operator adjusts the angle and position of the cutting edge of the cutting tool of a wafer scriber/breaker subject to his (her) experience and skill. This conventional adjustment method wastes much time and may produce an error, thereby affecting the productivity of the wafer scriber/breaker.

Therefore, it is desirable to provide a cutting tool angle adjustment method that eliminates the aforesaid drawbacks.

SUMMARY OF THE INVENTION

The present invention has been accomplished under the circumstances in view. It is therefore the main object of the present invention to provide a cutting tool angle adjustment method, which accurately adjusts the angle and position of the cutting tool with saves much adjusting time, thereby improving the productivity.

To achieve this and other objects of the present invention the cutting tool angle adjustment method includes the steps of:

(a) providing a transparent Mylar and suspending a cutting tool above the transparent Mylar, the cutting tool having a center axis, a transverse axis, and a cutting edge, the cutting tool having a predetermined specification;

(b) lowering the cutting tool vertically to the transparent Mylar to make an indentation on a top surface of the transparent Mylar by the cutting edge of the cutting tool;

(c) picking up the image of the indentation on the top surface of the transparent Mylar;

(d) digitalizing the image of the indentation into an image range of n*m pixels, and then figuring out a top edge proximity line and a bottom edge proximity line of the image of the indentation by means of a numerical analysis method;

(e) calculating a top angle of deviation $\theta_1$ between the top edge proximity line and a reference line, and a bottom angle of deviation $\theta_2$ between the bottom edge proximity line and the reference line; and (f) calculating a angle of correction $\theta_T$ of the transverse axis and a angle of correction $\theta_A$ of the center axis subject to the formulas of:

$\theta_T = f_1(\theta_1 - \theta_2)$, and $\theta_A = f_2(\theta_1 + \theta_2)$, in which $f_1$ and $f_2$ are correction parameters corresponding to the predetermined specification of the cutting tool.

In general, the present invention is to have the cutting tool be lowered and pressed on a transparent Mylar to produce an indentation before actual operation (scribing), and then to pick up the image of the indentation, and then to use a numerical analysis method and the set formula to automatically calculate the correction angle and position and to adjust the angle and position of the cutting tool subject to the calculation result, and then to repeat the calculation and adjustment procedure if necessary. Thus, the cutting tool and its cutting edge can be accurately adjusted to the correct angle and position to obtain a precise indentation. Further, by means of automatic adjustment of the cutting tool, the present invention saves much adjusting time, thereby improving the productivity.

DETAILED DESCRIPTION OF THE PREFERRED EMBODIMENT

Figure 1:
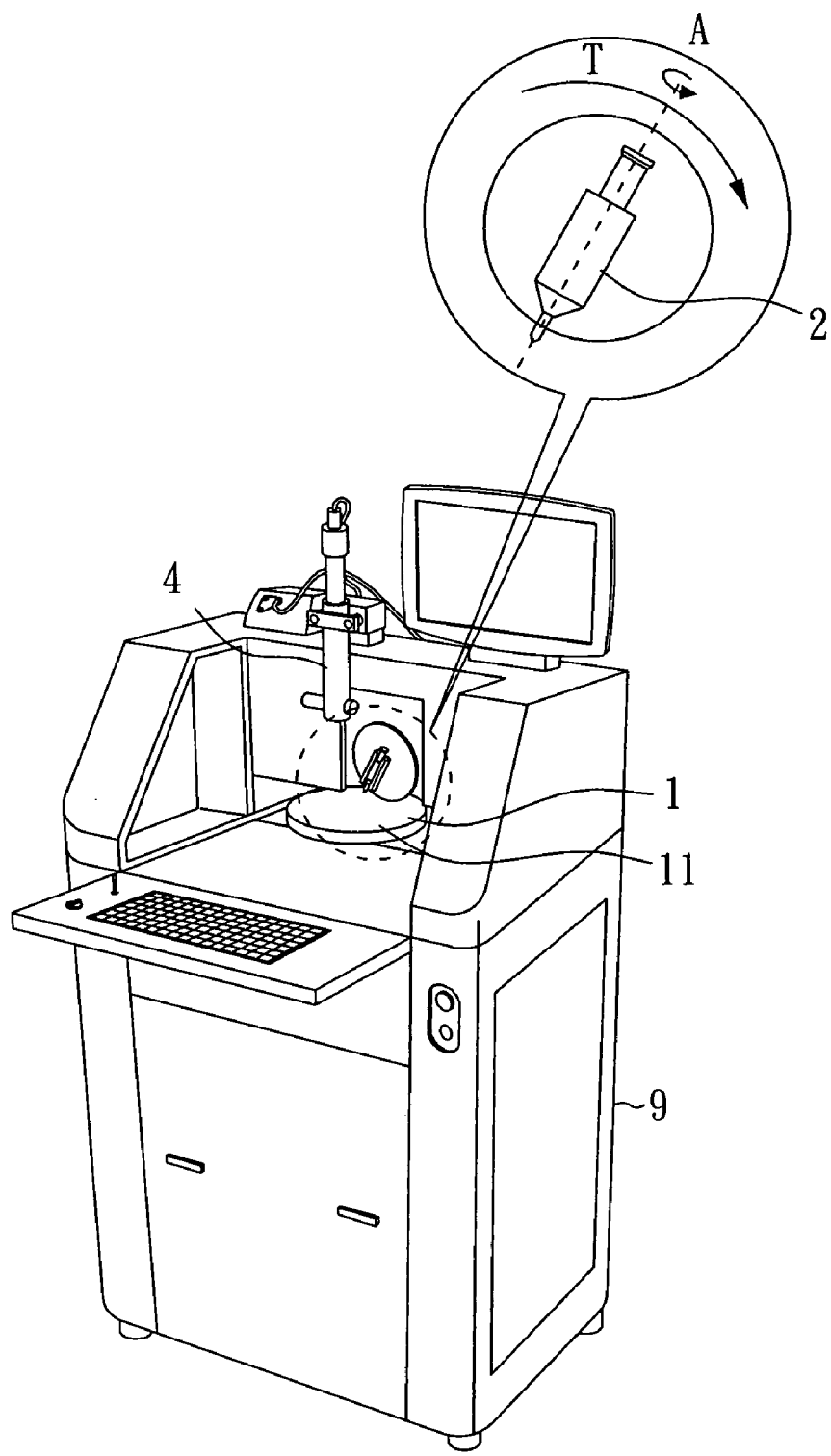
FIG. 1 is a schematic view showing the structure of a scriber according to the present invention.
Figure 2:
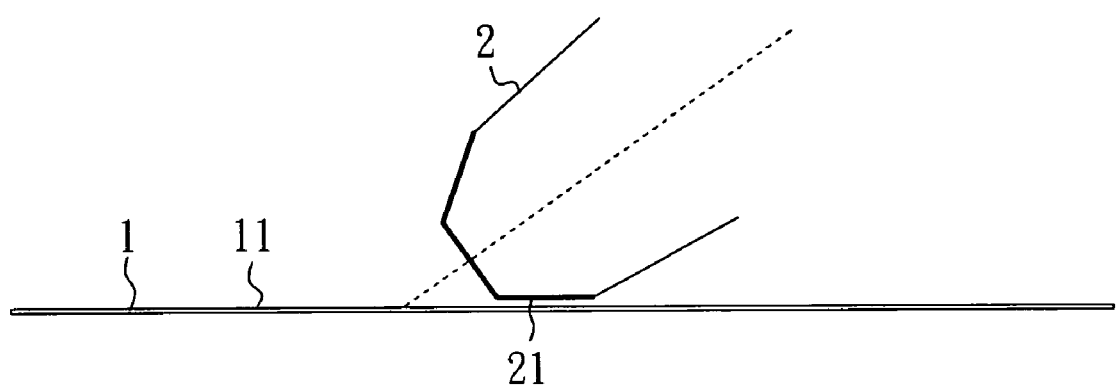
FIG. 2 is a schematic view showing the relationship between the cutting too and the Mylar according to the present invention.
Figure 3:
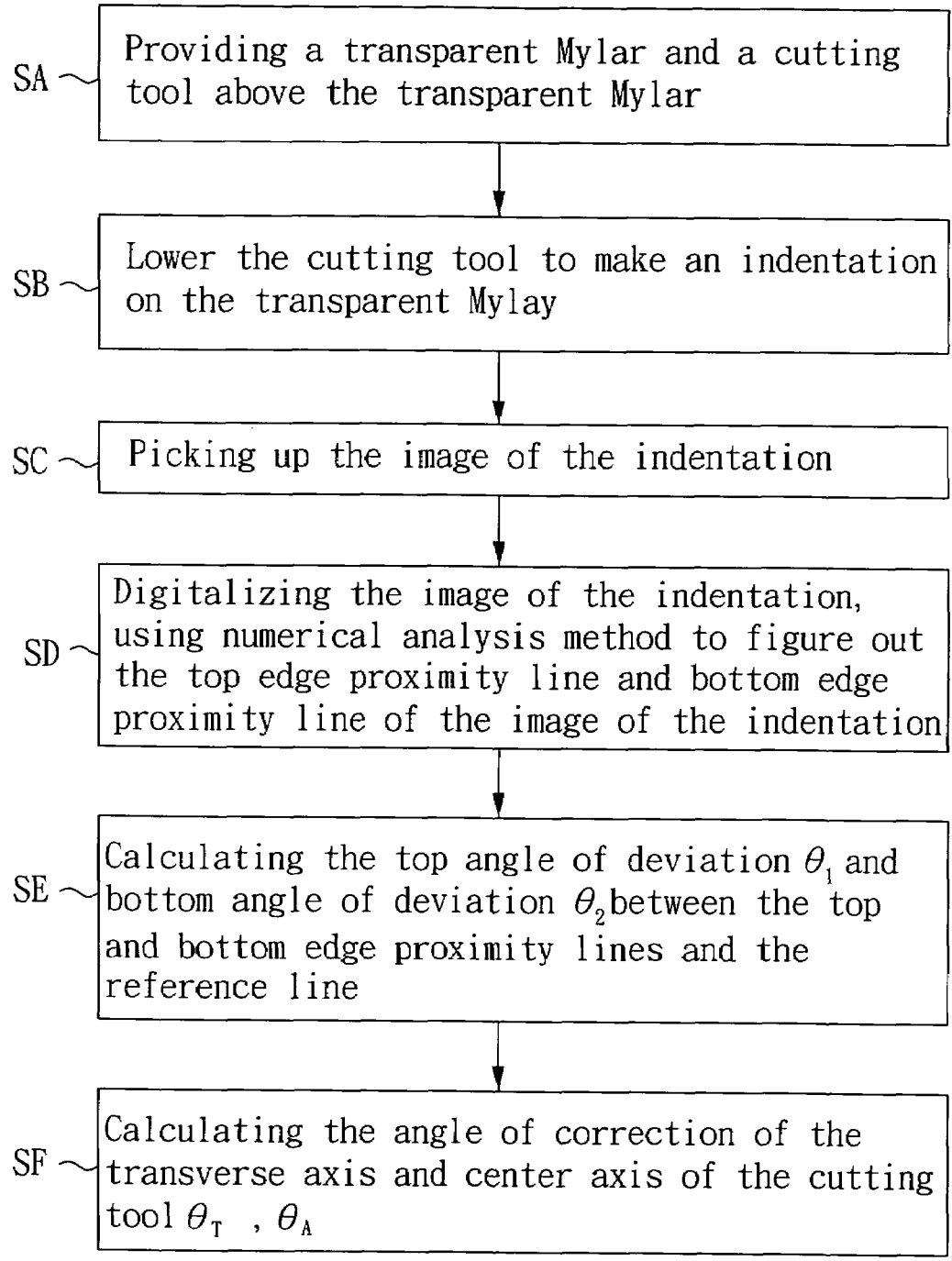
FIG. 3 is a flow chart of the present invention.

FIG. 1 is a schematic view showing the structure of a scriber according to the present invention. FIG. 2 is a schematic view showing the relationship between the cutting tool and the Mylar according to the present invention. FIG. 3 is a flow chart of the present invention. As shown in FIG. 1 FIG. 3, a scriber 9 is shown and which is provided with a transparent Mylar 1, a cutting tool 2, and an image pickup device 4. The cutting tool 2 is suspended above the Mylar 1, having a center axis (A-axis) and a transverse axis (T-axis).

According to this embodiment, the image pickup device 4 uses a CCD (charge-coupled device) to pick up images, and the cutting tool 2 is a diamond cutter having a predetermined specification (step SA).

Figure 4:
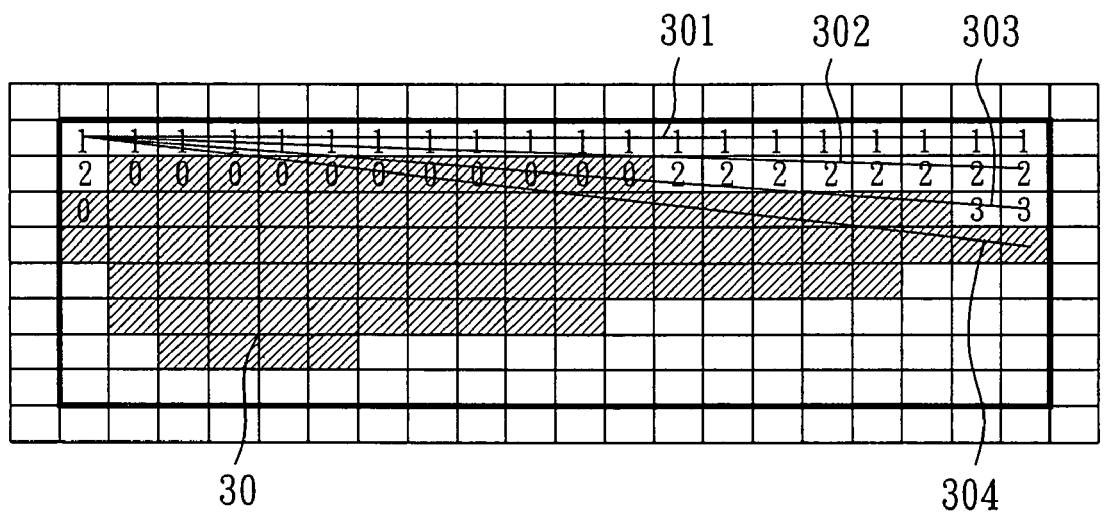
FIG. 4 is a schematic view showing the image of an indentation on a transparent Mylar according to the present invention.
Figure 8A:
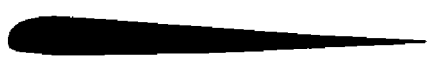
FIG. 8A is a schematic view showing one indentation pattern according to the present invention.
Figure 8B:
FIG. 8B is a schematic view showing another indentation pattern according to the present invention.
Figure 8C:
FIG. 8C is a schematic view showing still another indentation pattern according to the present invention.
Figure 8D:
FIG. 8D is a schematic view showing still another indentation pattern according to the present invention.
Figure 8E:
FIG. 8E is a schematic view showing still another indentation pattern according to the present invention.

Referring to FIG. 4 and FIG. 1~FIG. 3 again, after installation of the transparent Mylar 1 and the cutting tool 2, the cutting tool 2 is lowered vertically to make an indentation 3 on the top surface 11 of the transparent Mylar 1 by the cutting edge 21 of the cutting tool 2 (step SB). Because the cutting tool 2 is not held in the correct angle and position before adjustment, the indentation 3 may show any of a variety of uneven patterns. For example, FIG. 8A through FIG. 8D show four different, non-horizontal, uneven indentations produced due to biasing of the cutting tool 2. In actual practice of the cutting tool 2, it is expected to produce a horizontal, even indentation as shown in FIG. 8E. Thus, when driving the cutting tool 2 to make an operation, for example, scribing work, a horizontal, even, and accurate scribing line can be achieved.

Referring to FIG. 1~FIG. 4 again, after formation of an indentation 3 on the top surface 11 of the transparent Mylar 1 by the cutting edge 21 of the cutting tool 2, the CCD of the image pickup device 4 is driven to pick up the image 30 of the indentation 3 on the top surface 11 of the transparent Mylar 1 (step SC). Thereafter, as shown in FIG. 4, the image 30 of the indentation 3 is processed into an image range of n*m pixels through a digitalization process, and then the top edge proximity line 31 and the bottom edge proximity line 32 of the image 30 of the indentation 3 within the image range are calculated through a numerical analysis method (step SD).

During the aforesaid calculation process, a conventional image analysis software is used to automatically digitalize the image 30 of the indentation 3 into an image range of n*m pixels. Within this image range, the value for the pixel in each block is determined subject to the status whether it is filled with the image 30 of the indentation 3 or not, i.e., the value for the pixel in a block filled with the image 30 of the indentation 3 is set to be zero; on the contrary, the value is set subject to the relationship between the proximity line selected during calculation and the image 30 of the indentation 3.

In more detail, there are total 2*n*m proximity lines been figured out within the aforesaid image range of n*m pixels, i.e., total *n*m proximity lines will be figured out when calculating the top edge proximity line 31, and total *n*m proximity lines will also be figured out when calculating the bottom edge proximity line 32. For example, when one proximity line 301 of the total *n*m proximity lines is figured out during calculation of the top edge proximity line 31, it shows an unequal space between the proximity line 301 and the image 30 of the indentation 3. For example, there are two blank pixel blocks between the proximity line 301 and the image 30 of the indentation 3 in the left end, and the values for these two blank pixel blocks are set to be 1 and 2 respectively, and thereafter the pixel block value is set to be zero when touching the image 30 of the indentation 3. Further, there is one blank pixel block between the proximity line 301 and the image 30 of the indentation 3 at the second row from the left end of the proximity line 301 and thereafter the proximity line 301 touches the image 30 of the indentation 3, therefore the values for these two pixel blocks are set to be 1 and 0 respectively. And so on, use least square difference method of numerical analysis method to calculate the sum of the values of all pixel blocks of the proximity line 301 after the values having been respectively squared, and the value of the proximity line 301 is thus obtained. In the same way, calculate the values of proximity lines 302, 303, 304, . . . in proper order. After the values for all *n*m proximity lines have been figured out, compare the values to find the proximity line having the lowest value, which is the one in most proximity to and conformity with the top border of the image 30 of the indentation 3 and recognized to be the top edge proximity line 31 of the image 30 of the indentation 3. The calculation of the bottom edge proximity line 32 is same as the calculation of the top edge proximity line 31. When there are two proximity lines having the same smallest value after calculation, the first one is recognized to be the top edge proximity line (or bottom edge proximity line).

Figure 5:
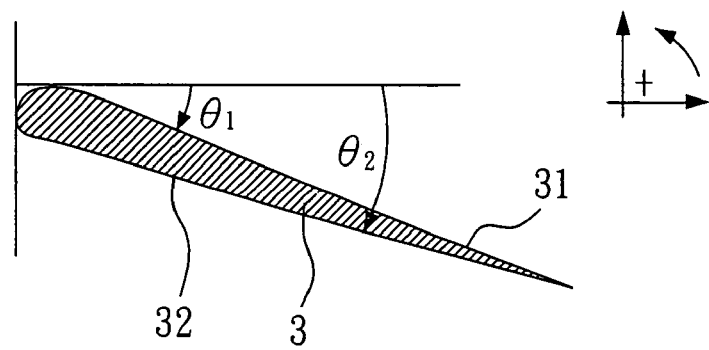
FIG. 5 is a schematic view showing the angle of deviation of the top edge proximity line and the bottom edge proximity line of the indentation according to the present invention.

Referring to FIG. 1~FIG. 5 again, after calculation of the top edge proximity line 31 and the bottom edge proximity line 32 through the aforesaid numerical analysis method, the top angle of deviation $\theta_1$ between the top edge proximity line 31 and a reference line and the bottom angle of deviation $\theta_2$ between the bottom edge proximity line 32 and the same reference line can then be figured out by means of triangle function (step SE). As illustrated in the coordinates in FIG. 5, the top angle of deviation $\theta_1$ and the bottom angle of deviation $\theta_2$ show a positive value and a negative value respectively.

After having obtained the top angle of deviation $\theta_1$ between the top edge proximity line 31 and the reference line and the bottom angle of deviation $\theta_2$ between the bottom edge proximity line 32 and the reference line, the angle of correction $\theta_T$ of the transverse axis (T-axis) of the cutting tool 2 and the angle of correction $\theta_A$ of the center axis (A-axis) of the cutting tool 2 can then be figured out by means of the following formulas:

$$\theta_T = f_1(\theta_1 - \theta_2), \text{ and}$$

$$\theta_A = f_2(\theta_1 + \theta_2),$$

in which $f_1$ and $f_2$ are correction parameters, which correspond to the predetermined specification of the cutting tool 2 (step SF), i.e., a different specification of cutting tool has a different correction parameter.

Figure 6:
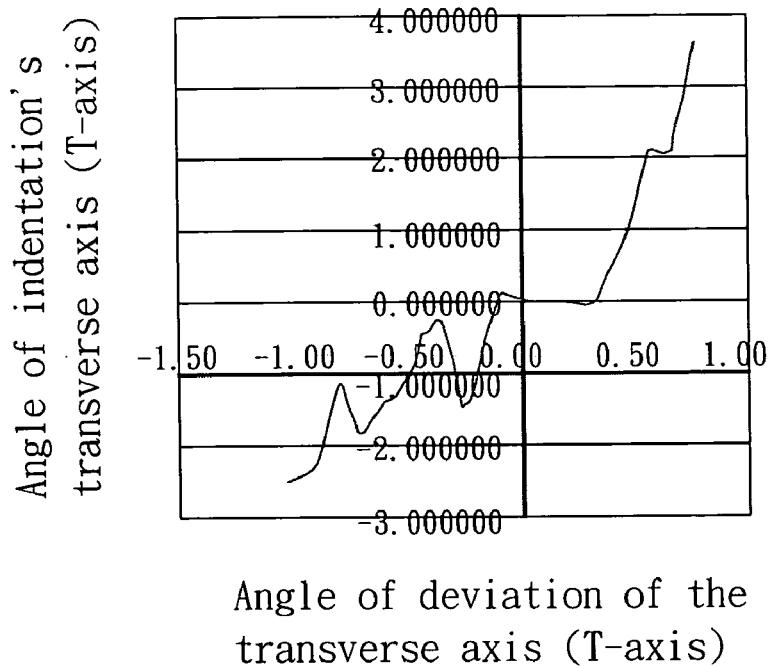
FIG. 6 is a graph showing the correlation between the angle of the indentation's transverse axis (T-axis) and the angle of deviation of the transverse axis (T-axis).
Figure 7:
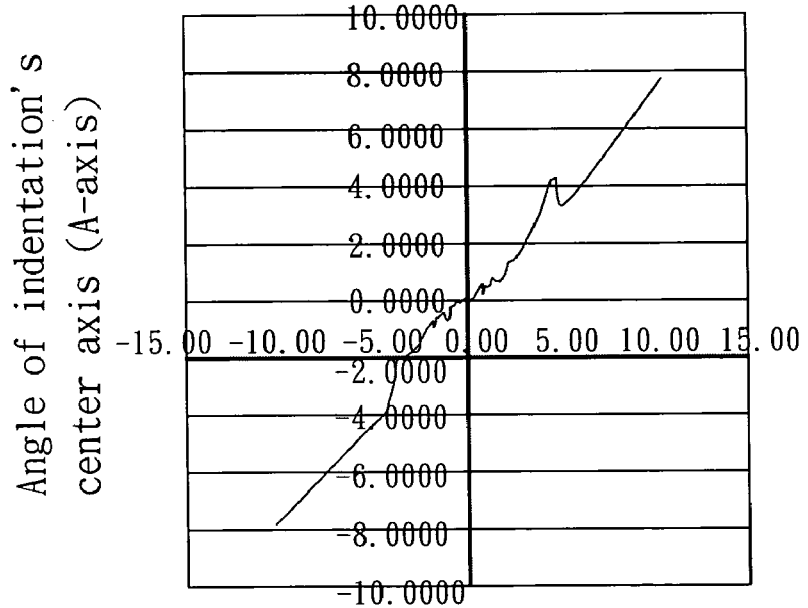
FIG. 7 is a curve drawing showing the correlation between the angle of the indentation's center axis (A-axis) and the angle of deviation of the center axis (A-axis).

According to this embodiment, a standard cutting tool 2 was used for test, and the test result is shown in FIG. 6 and FIG. 7. From the indications shown in FIG. 6 and FIG. 7, the values for $f_1$ and $f_2$ are deduced to be (1/2.8) and (1/1.55) respectively, i.e., the aforesaid formulas can be changed to:

$$\theta_T = (1/2.8)*(\theta_1 - \theta_2), \text{ and}$$

$$\theta_A = (1/1.55)*(\theta_1 + \theta_2),$$

Thus, the correction angle for the transverse axis (T-axis) of the cutting tool 2 and the correction angle for the center axis (A-axis) of the cutting tool 2 can be figured out for adjustment of the angle and position of the cutting tool 2. In general, the present invention is to have the cutting tool 2 be lowered and pressed on a transparent Mylar 1 to produce an indentation 3 before actual operation (scribing), and then to use an image pickup device 4 to pick up the image 30 of the indentation 3, and then to use a numerical analysis method and the set formula to automatically calculate the correction angle and position and to adjust the angle and position of the cutting tool 2 subject to the calculation result, and then to repeat the calculation and adjustment procedure if necessary. Thus, the cutting tool 2 and its cutting edge 21 can be accurately adjusted to the correct angle and position to obtain a horizontal and even indentation as shown in FIG. 8E. Further, by means of automatic adjustment, the present invention saves much adjusting time, thereby improving the productivity.

Although the present invention has been explained in relation to its preferred embodiment, it is to be understood that many other possible modifications and variations can be made without departing from the spirit and scope of the invention as hereinafter claimed.

What is claimed is:

1. A cutting tool angle adjustment method comprising the steps of:
   (a) providing a transparent material and suspending a cutting tool above said transparent material, said cutting tool having a center axis, a transverse axis, and a cutting edge, said cutting tool having a predetermined specification;
   (b) lowering said cutting tool vertically to said transparent material to make an indentation on a top surface of said transparent material by the cutting edge of said cutting tool;
   (c) picking up the image of said indentation on the top surface of said transparent material;
   (d) digitalizing the image of said indentation into an image range of n*m pixels, and then figuring out a top edge proximity line and a bottom edge proximity line of the image of said indentation by means of a numerical analysis method;
   (e) calculating a top angle of deviation $\theta_1$ between said top edge proximity line and a reference line, and a bottom angle of deviation $\theta_2$ between said bottom edge proximity line and said reference line; and
   (f) calculating a angle of correction $\theta_T$ of said transverse axis and a angle of correction $\theta_A$ of said center axis subject to the formulas of:

$\theta_T = f_1(\theta_1 - \theta_2)$, and $\theta_A = f_2(\theta_1 + \theta_2)$, in which $f_1$ and $f_2$ are correction parameters corresponding to the predetermined specification of said cutting tool.

2. The cutting tool angle adjustment method as claimed in claim 1, wherein said cutting tool is a diamond cutter.

3. The cutting tool angle adjustment method as claimed in claim 1, wherein during said step (c), an image pickup device is used to pick up the image of said indentation on the top surface of said transparent material.

4. The cutting tool angle adjustment method as claimed in claim 3, wherein said image pickup device is comprised of a charge-coupled device.

5. The cutting tool angle adjustment method as claimed in claim 1, wherein during said step (d), an image analysis software is used to automatically digitalize the image of said indentation on the top surface of said transparent material into said image range of n*m pixels.

6. The cutting tool angle adjustment method as claimed in claim 1, wherein during said step (d), said numerical analysis method is the least square difference method.

7. The cutting tool angle adjustment method as claimed in claim 1, wherein during said step (e), the calculation of said top angle of deviation $\theta_1$ between said top edge proximity line and said reference line and said bottom angle of deviation $\theta_2$ between said bottom edge proximity line and said reference line is done by means of triangle function.

* * * * *